US011477633B2

(12) United States Patent
Lee et al.

(10) Patent No.: US 11,477,633 B2
(45) Date of Patent: Oct. 18, 2022

(54) METHOD AND APPARATUS FOR MANAGING PACKET DATA NETWORK CONNECTION ON BASIS OF LOCAL AREA IN WIRELESS COMMUNICATION SYSTEM

(71) Applicant: Samsung Electronics Co., Ltd., Suwon-si (KR)

(72) Inventors: Ji-Cheol Lee, Suwon-si (KR); Song-Yean Cho, Seoul (KR); Sung-Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 16/863,299

(22) Filed: Apr. 30, 2020

(65) Prior Publication Data

US 2020/0260253 A1 Aug. 13, 2020

Related U.S. Application Data

(63) Continuation of application No. 16/369,775, filed on Mar. 29, 2019, now Pat. No. 10,645,564, which is a (Continued)

(30) Foreign Application Priority Data

Oct. 31, 2012 (KR) .................... 10-2012-0122706

(51) Int. Cl.
*H04W 8/02* (2009.01)
*H04W 76/10* (2018.01)
(Continued)

(52) U.S. Cl.
CPC ............. *H04W 8/02* (2013.01); *H04W 36/08* (2013.01); *H04W 76/10* (2018.02); *H04W 76/12* (2018.02)

(58) Field of Classification Search
CPC ....... H04W 8/02; H04W 76/12; H04W 76/10; H04W 36/08
See application file for complete search history.

(56) References Cited

U.S. PATENT DOCUMENTS

| 9,398,517 | B2 | 7/2016 | Faccin et al. |
| 10,251,050 | B2 | 4/2019 | Lee et al. |

(Continued)

FOREIGN PATENT DOCUMENTS

| EP | 2 487 944 A2 | 8/2012 |
| EP | 2487944 A2 | 8/2012 |

(Continued)

OTHER PUBLICATIONS

Panasonic, "Open issue for UE initiating LIPA/SIPTO in Solution 1", Nov. 20, 2009, 3GPP.*

(Continued)

*Primary Examiner* — Jae Y Lee
(74) *Attorney, Agent, or Firm* — Jefferson IP Law, LLP

(57) ABSTRACT

A method and an apparatus for providing, setting, maintaining, and releasing a packet data network (PDN) connection on the basis of a local area in a wireless communication system are provided. The method includes receiving the PDN subscription information on the basis of the local area from a business operator server, inspecting whether the current location information for the terminal exists in the PDN subscription information on the basis of the local area, and starting a procedure for setting the PDN on the basis of the local area when the current location information exists therein.

19 Claims, 12 Drawing Sheets

Related U.S. Application Data continuation of application No. 14/439,962, filed as application No. PCT/KR2013/009808 on Oct. 31, 2013, now Pat. No. 10,251,050.

(51) Int. Cl.
*H04W 76/12* (2018.01)
*H04W 36/08* (2009.01)

(56) References Cited

U.S. PATENT DOCUMENTS

| | | | |
|---|---|---|---|
| 10,645,564 B2* | 5/2020 | Lee | H04W 8/02 |
| 2010/0144362 A1 | 6/2010 | Bernard et al. | |
| 2011/0013623 A1* | 1/2011 | Hu | H04W 68/12 370/355 |
| 2011/0045826 A1* | 2/2011 | Kim | H04W 8/082 455/426.1 |
| 2011/0170469 A1 | 7/2011 | Watfa et al. | |
| 2011/0171953 A1 | 7/2011 | Faccin et al. | |
| 2011/0268086 A1 | 11/2011 | Liang et al. | |
| 2011/0292877 A1* | 12/2011 | Yeoum | H04W 8/12 370/328 |
| 2012/0008554 A1 | 1/2012 | Kim et al. | |
| 2012/0196599 A1* | 8/2012 | Cho | H04W 12/086 455/435.1 |
| 2012/0252481 A1 | 10/2012 | Anpat et al. | |
| 2012/0257598 A1* | 10/2012 | Karampatsis | H04W 8/082 370/331 |
| 2013/0059582 A1 | 3/2013 | Del Signore | |
| 2013/0308527 A1* | 11/2013 | Chin | H04W 64/003 370/328 |
| 2014/0059662 A1 | 2/2014 | Zhu et al. | |
| 2017/0222933 A1 | 8/2017 | Adjakple et al. | |

FOREIGN PATENT DOCUMENTS

| | | | | |
|---|---|---|---|---|
| KR | 10-2010-0082193 A | | 7/2010 | |
| KR | 10-2011-0037002 | * | 4/2011 | H04W 8/04 |
| KR | 10-2011-0037002 A | | 4/2011 | |
| KR | 10-2011-0121547 A | | 11/2011 | |
| KR | 10-2012-0104622 A | | 9/2012 | |
| KR | 10-2012-0115396 A | | 10/2012 | |
| WO | 2010/057200 A1 | | 5/2010 | |
| WO | WO 2010/064859 | * | 6/2010 | H04B 7/26 |
| WO | 2011/043571 A2 | | 4/2011 | |
| WO | 2011/137580 A1 | | 11/2011 | |
| WO | 2012/044628 A1 | | 4/2012 | |
| WO | 2012/138099 A2 | | 10/2012 | |

OTHER PUBLICATIONS

Panasonic; "Open issue for UE initiating LIPA/SIPTO in Solution1"; 3GPP 3rd Generation Partnership Project; Nov. 16-20, 2009; pp. 1-2; TD S2-096598; San Jose Del Cabo, Mexico.
Korean Office Action with English translation dated Dec. 23, 2019; Korean Appln. No. 10-2012-0122706.
European Search Report dated Mar. 4, 2022; European Appln. No. 21207589.9-1212.

* cited by examiner

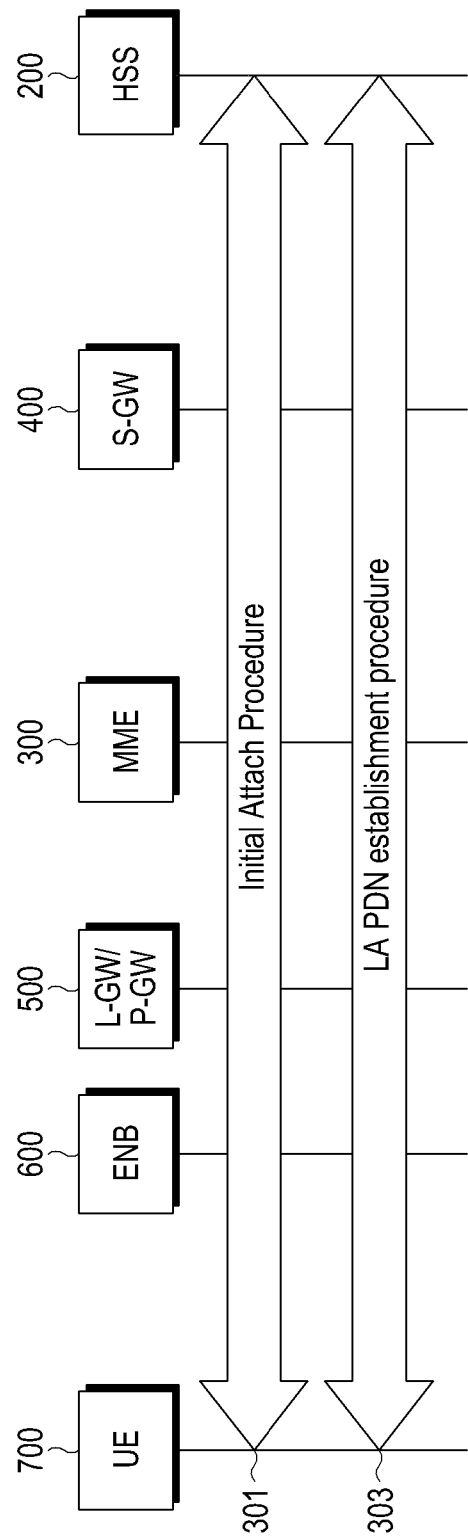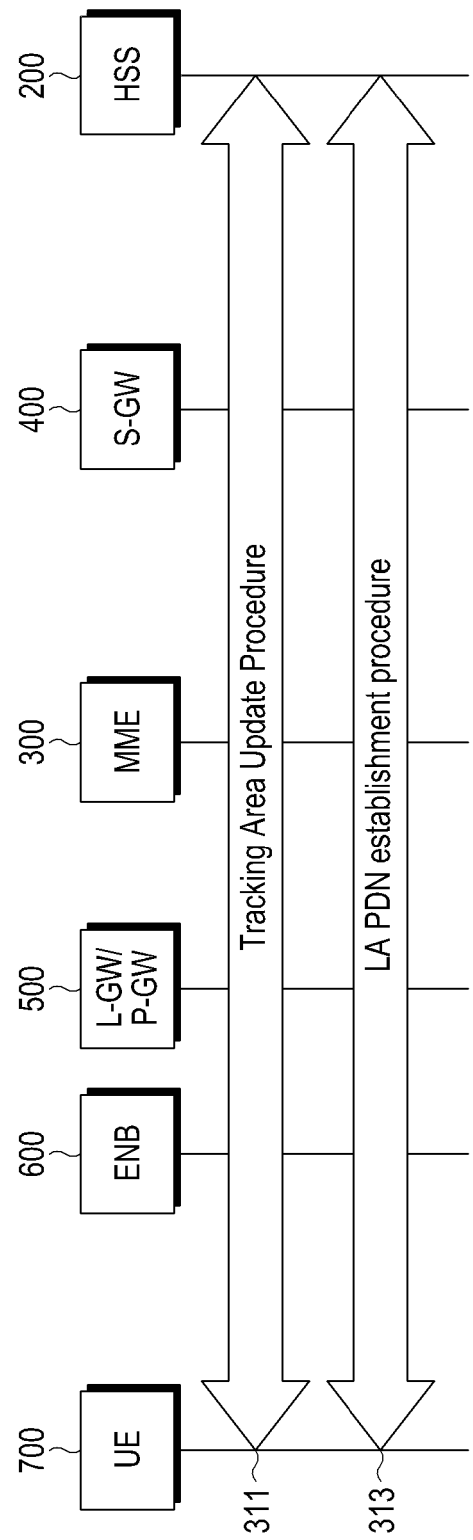

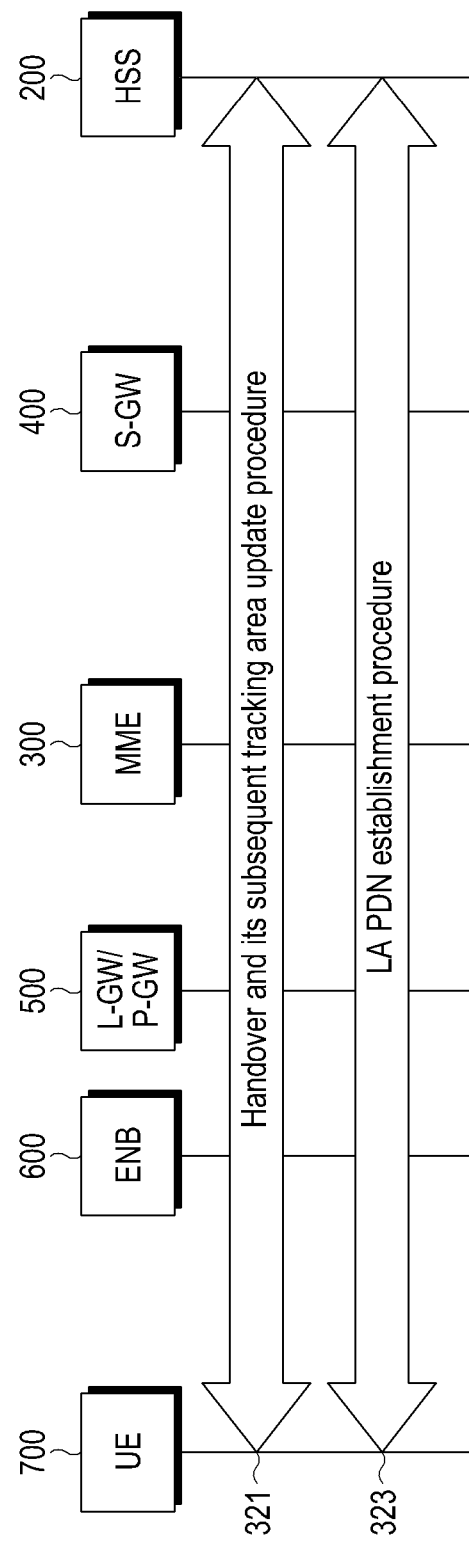

METHOD AND APPARATUS FOR MANAGING PACKET DATA NETWORK CONNECTION ON BASIS OF LOCAL AREA IN WIRELESS COMMUNICATION SYSTEM

CROSS-REFERENCE TO RELATED APPLICATION(S)

This application is continuation application of prior application Ser. No. 16/369,775, filed on Mar. 29, 2019, which is a continuation of prior application Ser. No. 14/439,962 filed on Apr. 30, 2015, which has issued as U.S. Pat. No. 10,251,050 on Apr. 2, 2019, and was based on and claimed priority under 35 U.S.C. § 371 of an International application number PCT/KR2013/009808, filed on Oct. 31, 2013 in the International Intellectual Property Office and was based on and claimed priority under 35 U.S.C § 119(a) of a Korean patent application number 10-2012-0122706 filed on Oct. 31, 2012 in the Korean Intellectual Property Office and assigned Serial, the entire disclosure of each of which is hereby incorporated by reference.

TECHNICAL FIELD

The present disclosure relates to a structure and procedure of a Local Area (LA) Packet Data Network (PDN). More particularly, the present disclosure relates to a method and apparatus for providing, establishing, maintaining, and releasing a PDN connection based on a local area.

BACKGROUND

Wireless communication systems have been developed to provide broadband data service such as multimedia service in addition to traditional voice service. Despite limited communication resources, various types of data services are in demand. Therefore, a more advanced wireless communication system is required.

To satisfy the demand, wireless communication systems that provide Packet Data Network (PDN)-based enhanced services, such as a Long Term Evolution (LTE) system (or an Evolved Packet System (EPS)) proposed by the $3^{rd}$ Generation Partnership Project 2 (3GPP2) have been deployed and have gained popularity.

A PDN may be deployed over a local area as well as a wide service area and research on specific procedures for operating a PDN in a local area is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for establishing a Local Area (LA) Packet Data Network (PDN) connection in a wireless communication system.

Another aspect of the present disclosure is to provide a method and apparatus for releasing an LA PDN connection in a wireless communication system.

Another aspect of the present disclosure is to provide a method and apparatus for maintaining an LA PDN connection in a wireless communication system.

Another aspect of the present disclosure is to provide a method and apparatus for reestablishing an LA PDN connection in a wireless communication system.

In accordance with an aspect of the present disclosure, a method for establishing a PDN connection by a User Equipment (UE) in a wireless communication system is provided. The method includes receiving LA PDN subscription information from an operator server, determining whether current location information about the UE is included in the LA PDN subscription information, and in the presence of the current location information about the UE in the LA PDN subscription information, starting an LA PDN establishment procedure.

In accordance with another aspect of the present disclosure, a UE for establishing a PDN connection in a wireless communication system is provided. The UE includes a receiver configured to receive LA PDN subscription information from an operator server, and a controller configured to determine whether current location information about the UE is included in the LA PDN subscription information, and in the presence of the current location information about the UE in the LA PDN subscription information, to control starting of an LA PDN establishment procedure.

In accordance with another aspect of the present disclosure, a method for updating subscription information about a UE by a Mobility Management Entity (MME) that manages mobility of the UE in a wireless communication system is provided. The method includes, if LA PDN subscription information about the UE is updated, receiving the updated LA PDN subscription information from an operator server, determining whether current location information about the UE is included in an LA PDN context including a Tracking Area (TA) list of the UE, and in the presence of the current location information about the UE in the LA PDN context, transmitting information indicating the update of the LA PDN subscription information to the UE.

In accordance with another aspect of the present disclosure, an MME for managing mobility of a UE in a wireless communication system is provided. The MME includes a communication interface configured to transmit and receive messages for updating LA PDN subscription information, and a controller configured, if LA PDN subscription information about the UE is updated, to control reception of the updated LA PDN subscription information from an operator server, to determine whether current location information about the UE is included in an LA PDN context including a TA list of the UE, and in the presence of the current location information about the UE in the LA PDN context, to control transmission of information indicating the update of the LA PDN subscription information to the UE.

In accordance with another aspect of the present disclosure, a communication method of a Base Station (BS) during handover of a UE using a PDN in a wireless communication system is provided. The communication method includes, if the UE performs handover to a target BS within an LA in a connected state, determining whether current location information about the UE is included in an LA PDN context, and in the presence of the current location information about the UE in the LA PDN context, transmitting a handover request message including an LA PDN context related to the handover to the target BS.

In accordance with another aspect of the present disclosure, a BS for supporting handover of a UE using a PDN in a wireless communication system is provided. The BS includes a communication interface configured to transmit and receive messages related to the handover of the UE, and a controller configured, if the UE performs handover to a target BS within an LA in a connected state, to determine whether current location information about the UE is included in an LA PDN context, and in the presence of the current location information about the UE in the LA PDN context, to transmit a handover request message including an LA PDN context related to the handover to the target BS.

In accordance with another aspect of the present disclosure, a method for releasing a PDN connection by an MME that manages mobility of a UE in a wireless communication system is provided. The method includes receiving a Tracking Area Update (TAU) request from the UE, determining whether current location information about the UE is included in an LA PDN TA list, and in the absence of the current location information about the UE in the LA PDN TA list, starting an LA PDN disconnection procedure.

In accordance with another aspect of the present disclosure, a method for releasing a PDN connection by an MME that manages mobility of a UE in a wireless communication system is provided. The method includes determining whether current location information about the UE is included in an LA PDN TA list, and in the absence of the current location information about the UE in the LA PDN TA list, maintaining an LA PDN context of the UE until expiration of an LA PDN context retain timer.

In accordance with another aspect of the present disclosure, a method for reestablishing a PDN connection by an MME that manages mobility of a UE in a wireless communication system is provided. The method includes receiving a service request message from the UE that returns to an LA, transmitting an initial context setup request message including an LA PDN context and an LA bearer context of the UE to a BS, and transmitting a bearer modify request for LA PDN reconnection of the UE to a serving gateway.

In accordance with another aspect of the present disclosure, a method for reestablishing a PDN connection by an MME that manages mobility of a UE in a wireless communication system is provided. The method includes receiving a TAU request from the UE that performs handover in a connected state from a source BS outside an LA to a target BS within the LA, determining whether current location information about the UE is included in an LA PDN context before expiration of an LA PDN context retain timer, and in the presence of the current location information about the UE in the LA PDN context, transmitting to the target BS a bearer setup request including an LA PDN context and a bearer context.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A, 3B, and 3C are diagrams illustrating signal flows for a triggering method in an LA PDN establishment procedure in a wireless communication system according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure, a Packet Data Network (PDN) activated in a Local Area (LA) is defined as an LA PDN. The LA includes tracking areas in which a packet data service is available and each tracking area includes adjacent cells.

Figure 1A:
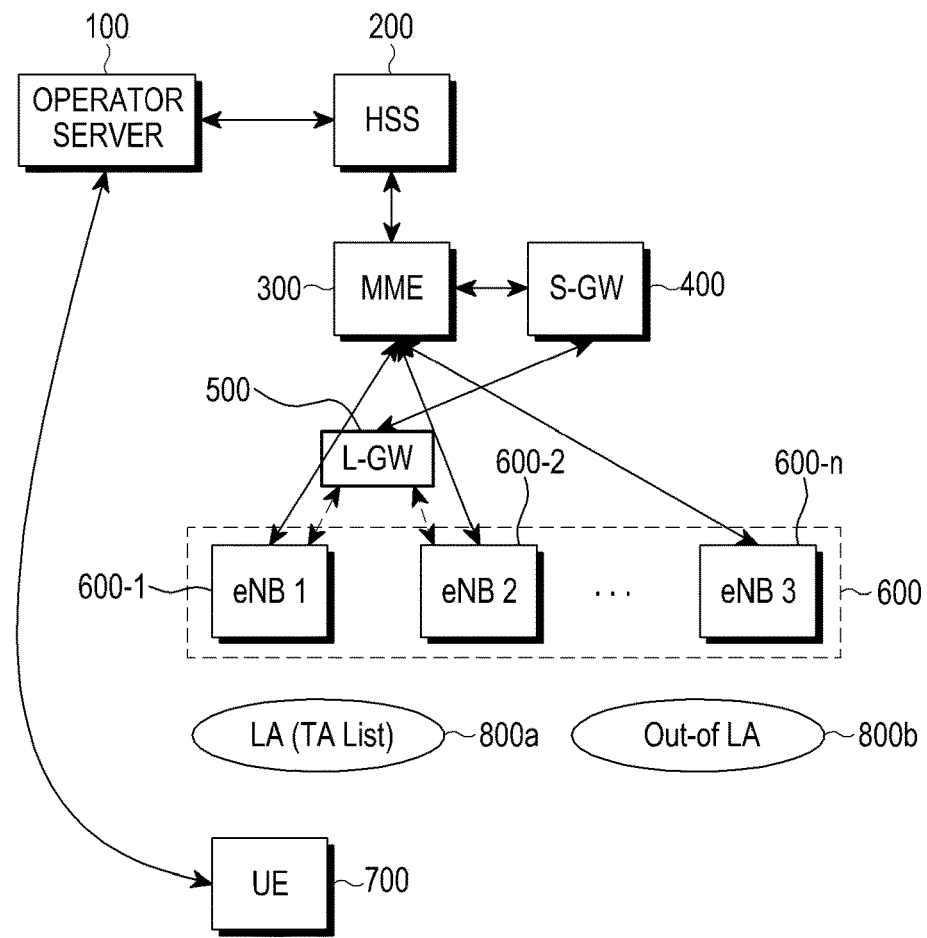
FIG. 1A illustrates a wireless communication system that deploys a Local Area (LA) Packet Data Network (PDN) according to an embodiment of the present disclosure.

FIG. 1A illustrates a wireless communication system that deploys an LA PDN according to an embodiment of the present disclosure. The wireless communication system illustrated in FIG. 1 is an LA PDN deployed, for example, in a 3rd Generation Partnership Project (3GPP) Evolved Packet System (EPS). However, it is to be understood that the present disclosure may be deployed in any of various communication systems.

Referring to FIG. 1A, an operator server 100 is a server of a communication operator or a service operator that provides a packet data service. A Home Subscriber Server (HSS) 200 manages authentication information, subscription information, and service information about a User Equipment (UE) 700. It is assumed that the UE 700 is any UE accessing a PDN such as the Internet through a PDN GateWay (P-GW) like a Serving GateWay (S-GW) 400 and a Local GateWay (L-GW) 500. The UE 700 may communicate with other Internet Protocol (IP)-based communication devices (not shown) within a local network (that is, LA) 800a by creating a Local IP Area (LIPA) PDN connection through the L-GW 500. LIPA represents local IP access in an EPS. In an embodiment of the present disclosure, a LIPA PDN is an example of the LA PDN. However, it is to be clearly understood that the LA PDN of the present disclosure is not limited to the LIPA PDN. In other words, the various embodiments of the present disclosure are applicable, for example, to various types of wireless communication systems in which an L-GW may be located near to an evolved Node B (eNB) as well as to Selective IP Traffic Offloading (SIPTO) or LIPA described in 3GPP TS 23.401.

In FIG. 1A, a Mobility Management Entity (MME) 300 is responsible for mobility and location registration of the UE 700 and management of a Tracking Area (TA) list for location management of the UE 700. The MME 300 is also responsible for a control plane for exchanging control information between the UE 700 and an Evolved Packet Core (EPC). If subscription information about a UE (i.e., a user) in an LA PDN (referred to as "LA PDN subscription information") is updated and the current location of the UE 700 is included in an LA PDN context, the MME 300 provides information indicating update of the LA PDN subscription information to the UE 700 in an embodiment of the present disclosure.

The EPC includes the MME 300, the S-GW 400, and the L-GW 500. The S-GW 400 acts as a reference point that is not changed at a network side during handover. In other words, even though the UE 700 moves between a plurality of eNBs 600 (i.e., eNBs 600-1, 600-2 ... 600-n), the S-GW 400 is not changed. The S-GW 400 provides a data bearer for a packet data service under the control of the MME 300. The L-GW 500 creates a LIPA PDN connection and assigns an IP address to the UE 500, upon request of the S-GW 400.

The eNBs 600 transmit messages used during procedures for establishing, maintaining, and releasing an LA PDN connection between the network and the UE 700. If the UE 700 performs handover within an LA, an eNB 600 checks whether current location information about the UE 700 is included in an LA PDN context. In the presence of the current location information about the UE 700, the eNB 600 provides an LA PDN context related to the handover to a target eNB to which the UE 700 moves.

In an embodiment of the present disclosure illustrated in FIG. 1, it is assumed that other UEs (not shown) that do not use LIPA PDN connections use a general packet data service in a service area 800b other than an LA.

Figure 1B:
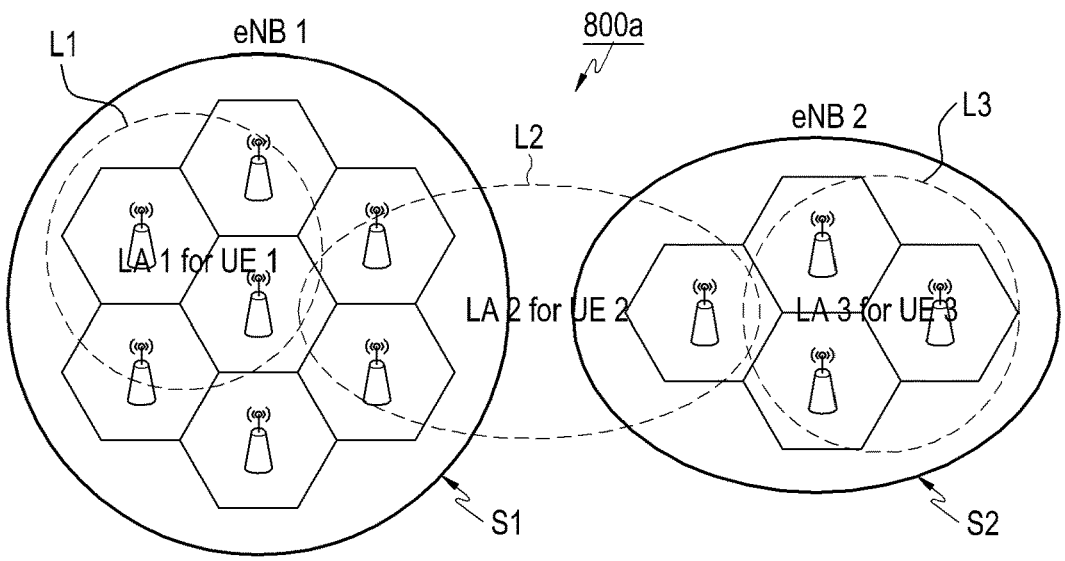
FIG. 1B illustrates a configuration of LAs according to an embodiment of the present disclosure.

FIG. 1B illustrates a configuration of LAs according to an embodiment of the present disclosure.

Referring to FIG. 1B, one LA L1, L2, or L3 800a may be configured per UE 700. One eNB eNB1 or eNB2 may configure a plurality of LAs. In FIG. 1B, eNB1 configures two LAs L1 and L2 and eNB2 configures two LAs L2 and L3. An LA such as L2 may be configured to be overlapped between different eNBs eNB1 and eNB2.

After subscription information (that is, LA PDN subscription information) about a UE (i.e., a user) in a PDN (that is, an LA PDN) configured by adding the LAs 800a to an existing PDN is initially provided to the UE 700, the LA PDN subscription information may be updated dynamically. The LA PDN subscription information is also related to the configuration of the LA PDN. If the terminal 700 moves along a boundary of the LA 800a in an idle or activated state, the LA PDN connection may be activated or deactivated.

Hereinbelow, a description will be given of how an LA PDN is configured initially or dynamically, established, maintained during movement of the UE 700, and disconnected according to an embodiment of the present disclosure.

A procedure for initially providing LA PDN subscription information according to an embodiment of the present disclosure will first be described below.

LA PDN subscription information about a UE is stored in a Universal Subscriber Identity Module (USIM) of the UE. The LA PDN subscription information includes at least one of a TA list, an LA Access Point Name (LA APN), an LA Identifier (LA ID), additional information, and existing PDN configuration data. The additional information may include an LA verbose name and an LA icon. Accordingly, LA PDN subscription information stored in the HSS 200 illustrated in FIG. 1A includes at least one of a TA list, an LA APN, an LA ID, and existing PDN configuration data.

A procedure for dynamically updating LA PDN subscription data or information according to the present disclosure will be described below.

The operator server 100 illustrated in FIG. 1A may update the LA PDN subscription information. If the MME 300 has an LA PDN context and current location information about the UE is included in the LA PDN context, the MME 300 may transmit a message for triggering a procedure for updating the LA PDN subscription information between the UE 700 and the operator server 100.

If the LA PDN subscription information stored in the UE 700 has been changed, the operator server 100 may update the LA PDN subscription information to the changed LA PDN subscription information. The UE 700 may request establishment or termination of an LA PDN connection to a network based on the updated LA PDN subscription information.

Figure 2:
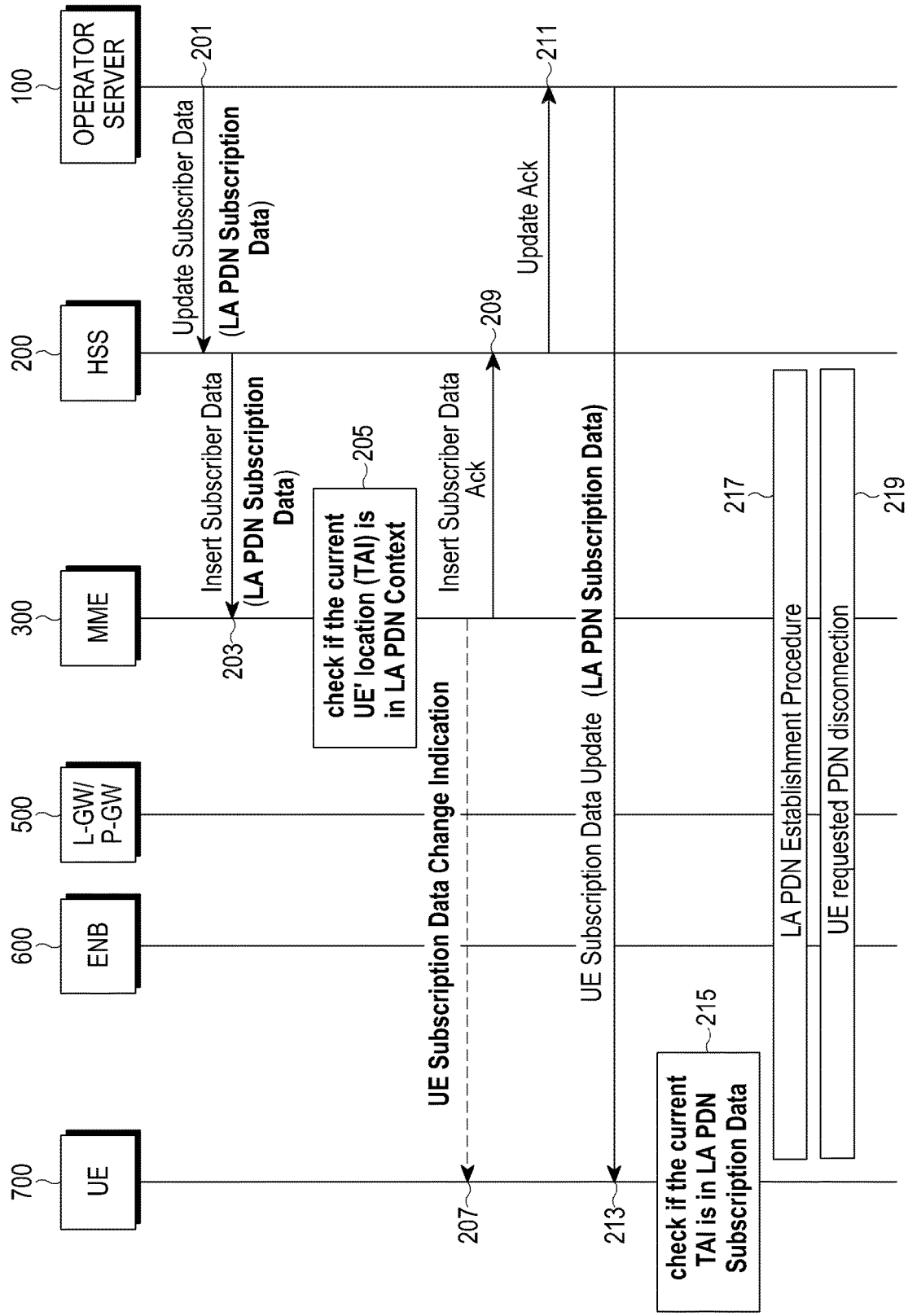
FIG. 2 is a diagram illustrating a signal flow for a procedure for updating LA PDN subscription information in a wireless communication system according to an embodiment of the present disclosure.

FIG. 2 is a diagram illustrating a signal flow for a procedure for updating LA PDN subscription information in a wireless communication system according to an embodiment of the present disclosure.

Referring to FIG. 2, the operator server 100 updates the LA PDN subscription information about the UE 700 using the LA 800a, stored in the HSS 200 in operations 201 to 209. For example, if the LA PDN subscription information about the UE 700 has been changed, the operator server 100 provides the updated LA PDN subscription information to the HSS 200 and the HSS 200 stores the updated LA PDN subscription information in operation 201. In operation 203, the HSS 200 transmits the updated LA PDN subscription information to the MME 300. In operations 201 and 203, the operator server 100 and the HSS 200 may transmit only the updated LA PDN subscription information or entire subscription information about the UE 700 including the LA PDN subscription information.

The MME 300 determines whether current location information about the UE 700 (for example, a current TA Indication (TAI) of the UE 700) is present in an LA PDN context managed by the MME 300 in operation 205. The LA PDN context includes an LA APN, a TA list, and existing LA PDN information.

The LA PDN subscription information about the UE 700 includes existing PDN information and information about an area in which a PDN connection may be created. This LA PDN subscription information includes an APN, an LA ID, a TA list, an LA verbose name, an LA icon, and existing PDN subscription information. After receiving the updated LA PDN subscription information, the UE 700 determines whether the TAI indicating the current location is included in the updated LA PDN subscription information by checking the TAI indicating the current location of the UE 700 and the updated LA PDN subscription information. If the TAI is included in the updated LA PDN subscription information but the UE 700 is not currently connected to any LA PDN, the UE 700 may request creation of an LA PDN.

In an embodiment of the present disclosure, it is assumed that the LA PDN context includes the current location information about the UE 700. Subsequently, the MME 300 transmits information indicating that the LA PDN subscription information has been changed to the UE 700 in operation 207 and transmits ACKnowledgement (ACK) information indicating that the MME 300 has received the updated LA PDN subscription information to the HSS 200 in operation 209. Operation 207 is performed so that the UE 700 may initiate an Over The Air (OTA) connection with the operator server 100 to receive the updated LA PDN subscription information. Operation 207 is optional. Further, even though operation 207 is not performed, the UE 700 may periodically request the updated LA PDN subscription information to the network and receive it from the network.

In operation 211, the HSS 200 transmits confirmation information indicating that the LA PDN subscription information about the UE 700 has been updated to the operator server 100. The operator server 100 transmits the LA PDN subscription information to the UE 700 through a mobile communication network (OTA) in operation 213. In operation 215, the UE 700 determines whether the current location information indicating the current location of the UE 700, for example, the current TAI is included in the updated LA PDN subscription information received in operation 213.

In an embodiment of the present disclosure, it is assumed that the current location information (TAI) is present in the updated LA PDN subscription information. In operation 217, the UE 700 performs an LA PDN establishment procedure, which will be described later. Upon termination of communication in the LA, a later-described UE requested PDN disconnection procedure is performed in operation 219.

According to an embodiment of the present disclosure, operation 213 may be performed differently in the following two cases.

In the case where the current location information (TAI) about the UE 700 is included in the updated LA PDN subscription information but the UE 700 does not have an LA PDN context related to the current location information (TAI), the UE 700 starts an LA entry procedure by a UE requested PDN connectivity procedure. On the other hand, in the case where the current location information (TAI) about the UE 700 is not included in the updated LA PDN subscription information but the UE 700 has an LA PDN context related to the current location information (TAI), the UE 700 starts a UE requested PDN disconnection procedure.

Figure 4:
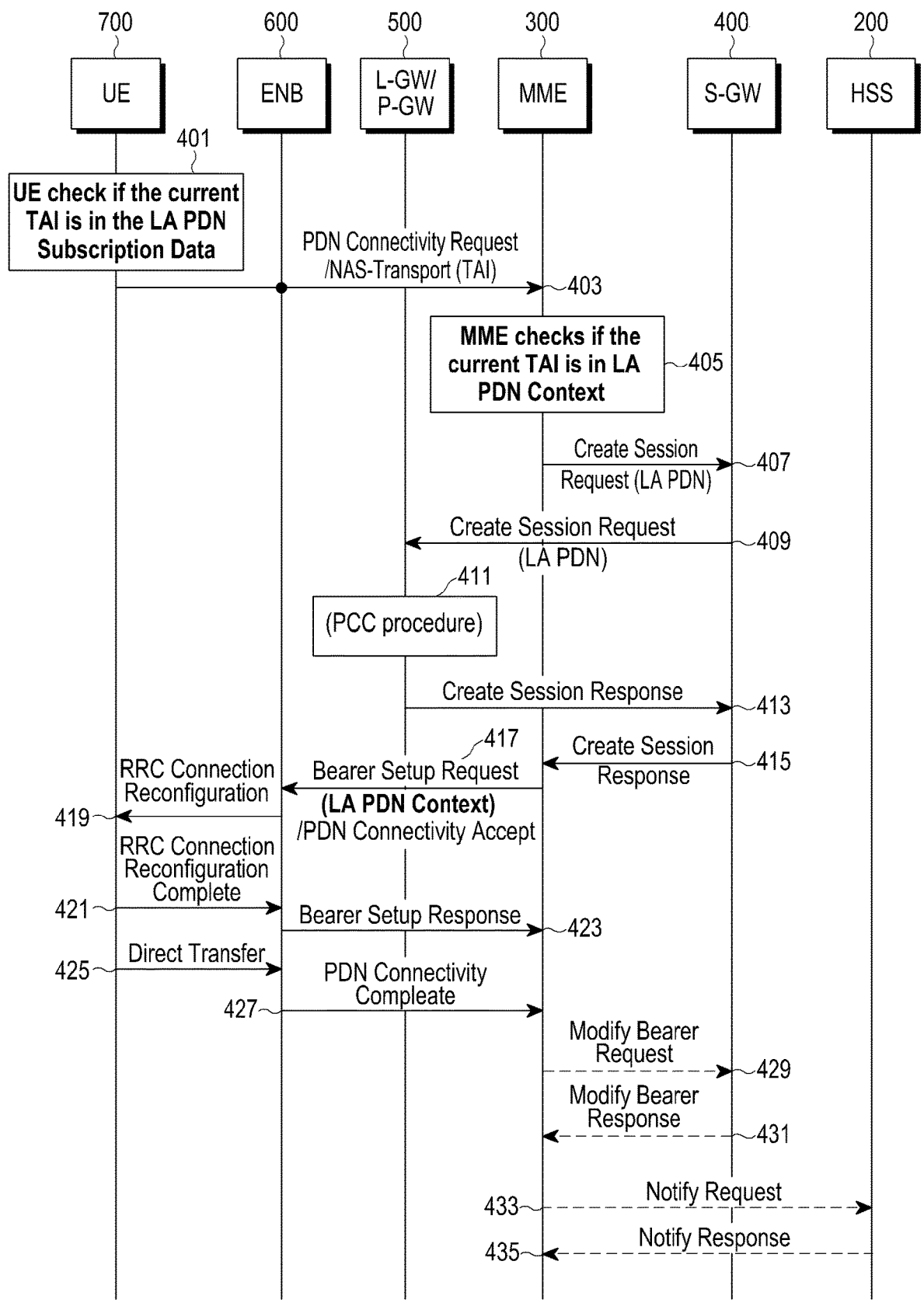
FIG. 4 is a diagram illustrating a signal flow for an LA PDN establishment procedure according to an embodiment of the present disclosure.

With reference to FIGS. 3A to 4, the LA PDN establishment procedure performed in operation 217 of FIG. 2 will be described. Before describing the LA PDN establishment procedure, triggering of the LA PDN establishment procedure will first be described below.

FIG. 3A illustrates a triggering method in an LA PDN establishment procedure according to an embodiment of the present disclosure.

Referring to FIG. 3A, the UE 700 first performs an initial attach procedure defined in section 5.3.2.1 of 3GPP TS 23.401 in operation 301. The MME 300 downloads subscription information about the UE 700 from the HSS 200 in the initial attach procedure.

In operation 303, the UE 700 determines whether its current location information (TAI) is included in an LA PDN context. In the presence of the current location information (TAI) in the LA PDN context, the UE 700 starts a UE requested PDN connectivity procedure defined in section 5.10.2 of 3GPP TS 23.401. If the UE 700 is allowed to establish an LA PDN, the MME 300 checks the subscription information about the UE 700. The above-described procedure of FIG. 3A may be understood as an attach-triggered PDN establishment procedure.

FIG. 3B illustrates a triggering method in an LA PDN establishment procedure according to an embodiment of the present disclosure.

Referring to FIG. 3B, when the UE 700 enters an LA in idle state in operation 311, the UE 700 performs, for example, a Tracking Area Update (TAU) procedure using an active flag as defined in sections 5.5.5.1 & 5.3.3.2 of 3GPP 23.401. The MME 300 downloads LA PDN subscription information from an old MME (not shown) used before the UE 700 enters the LA or the HSS 200. The UE 700 determines whether its current location information (TAI) (the TAI includes a TA Code (TAC) indicating the current location of the UE 700) is included in the LA PDN subscription information. In the presence of the current location information (TAI) in the LA PDN subscription information, the UE 700 starts the UE requested PDN connectivity procedure defined in section 5.10.2 of 3GPP TS 23.401 in operation 313.

If the UE 700 is allowed to establish an LA PDN, the MME 300 checks subscription information about the UE 700. The above-described procedure of FIG. 3B may be understood as a TAU-triggered PDN establishment procedure.

FIG. 3C illustrates a triggering method in an LA PDN establishment procedure according to an embodiment of the present disclosure.

Referring to FIG. 3C, when the UE 700 enters an LA in connected state, the UE 700 and the network perform, for example, an S1 handover or X2 handover procedure and an accompanying TAU procedure defined in sections 5.3.3.1 & 5.3.3.2 of 3GPP 23.401 in operation 321. The MME 300 downloads LA PDN subscription information from an old MME (not shown) used before the UE 700 enters the LA or the HSS 200. The UE 700 determines whether its current location information (TAI) is included in the LA PDN subscription information. In the presence of the current location information (TAI) in the LA PDN subscription information, the UE 700 starts the UE requested PDN connectivity procedure defined in section 5.10.2 of 3GPP TS 23.401 in operation 323. If the UE 700 is allowed to establish an LA PDN, the MME 300 checks subscription information about the UE 700. The above-described procedure of FIG. 3C may be understood as a handover & TAU-triggered PDN establishment procedure.

When the UE 700 enters an LA, the LA PDN establishment procedure may be initiated by one of the above three triggering methods according to an embodiment of the present disclosure. In the LA PDN establishment procedure, the MIME 300 checks the LA PDN subscription information received from the HSS 200. If the LA PDN subscription information is valid, the MME 300 creates an LA PDN session with the L-GW 500 (that is, the P-GW). The MIME 300 starts to establish an LA PDN bearer using an LA PDN context. The LA PDN context includes LA PDN information, a TA list, and an LA ID. After the LA PDN bearer is established, the eNB 600 maintains the LA PDN bearer context.

FIG. 4 is a diagram illustrating a signal flow for an LA PDN establishment procedure according to an embodiment of the present disclosure.

Referring to FIG. 4, the UE 700 determines whether its current location information (TAI) is included in LA PDN subscription information in operation 401. In an embodiment of the present disclosure, it is assumed that the current location information (TAI) about the UE 700 is included in the LA PDN subscription information. In operation 403, the UE 700 determines to start an LA PDN connectivity procedure and transmits an LA PDN connectivity request to the MME 300 by a Non Access Stratum (NAS) transport message.

The MME 300 determines whether the current location information (TAI) about the UE 700 is included in an LA PDN context in operation 405. In an embodiment of the present disclosure, it is assumed that the current location information (TAI) is included in the LA PDN context. In operation 407, the MME 300 accepts the LA PDN connectivity request received from the UE 700 in operation 403 and transmits a create session request message along with the LA PDN context to the S-GW 400.

The S-GW 400 transmits a create session request message along with the LA PDN context to the L-GW 500 (that is, the P-GW) in operation 409. In operation 411, the L-GW 500 (that is, the P-GW) which performs a PCC function creates a session for connection establishment for the UE 700 and transmits a create session response message to the S-GW 400 in operation 413. The S-GW 400 transmits a create session response message indicating reception of the create session response message in operation 411 to the MME 300 in operation 415. In operation 417, the MME 300 allows LA PDN establishment for the UE 700 and transmits a bearer setup request along with the LA PDN context to the eNB 600 according to an embodiment of the present disclosure.

Subsequently, the eNB 600 transmits a Radio Resource Control (RRC) connection reconfiguration message to the UE 700 in operation 419 and receives an RRC connection reconfiguration complete message from the UE 700 that has completed RRC connection reconfiguration in response to the RRC connection reconfiguration message in operation 421. In operation 423, the eNB 600 transmits a bearer setup response message to the MME 300 in response to the bearer setup request message received in operation 417.

In operation 425, the UE 700 transmits a direct transfer message indicating PDN connection completion to the eNB 600. The eNB 600 transmits a message indicating the PDN connection completion of the UE 700 to the MME 300 in operation 427. The MME 300 transmits a message requesting bearer establishment for the UE 700 that has completed the PDN connection establishment to the S-GW 400 in operation 429 and the S-GW 400 establishes a bearer and transmits a response message indicating completion of the bearer establishment to the MME 300 in operation 431.

In operation 433, when determining that the bearer establishment is completed, the MME 300 transmits a notify request message to the HSS 200. The HSS 200 transmits a notify response message to the MME 300 in operation 435.

In the above-described LA PDN establishment procedure illustrated in FIG. 4, the other operations except operations 401, 405, and 417 may be performed in the same manner as the UE requested PDN connectivity procedure defined in section 5.10.2 of 3GPP TS 23.401.

After the LA PDN connection establishment is completed according to the procedure of FIG. 4, the UE 700 may move to another eNB inside or outside the LA in active mode.

A source eNB to which the LA PDN connection has been established transmits an LA PDN handover context for the UE 700 to a target eNB to which the UE has moved (has performed handover). The LA PDN handover context includes the LA PDN context and an LA PDN bearer context. The LA PDN bearer context is a context including bearer configuration information for transmitting traffic received via an LA PDN connection. The LA PDN context and the LA PDN bearer context may be transmitted by an X2 handover request or S1 handover request message well known to the EPS. The S1 handover request message is transmitted from the source eNB to the target eNB through the MME 300.

Figure 5:
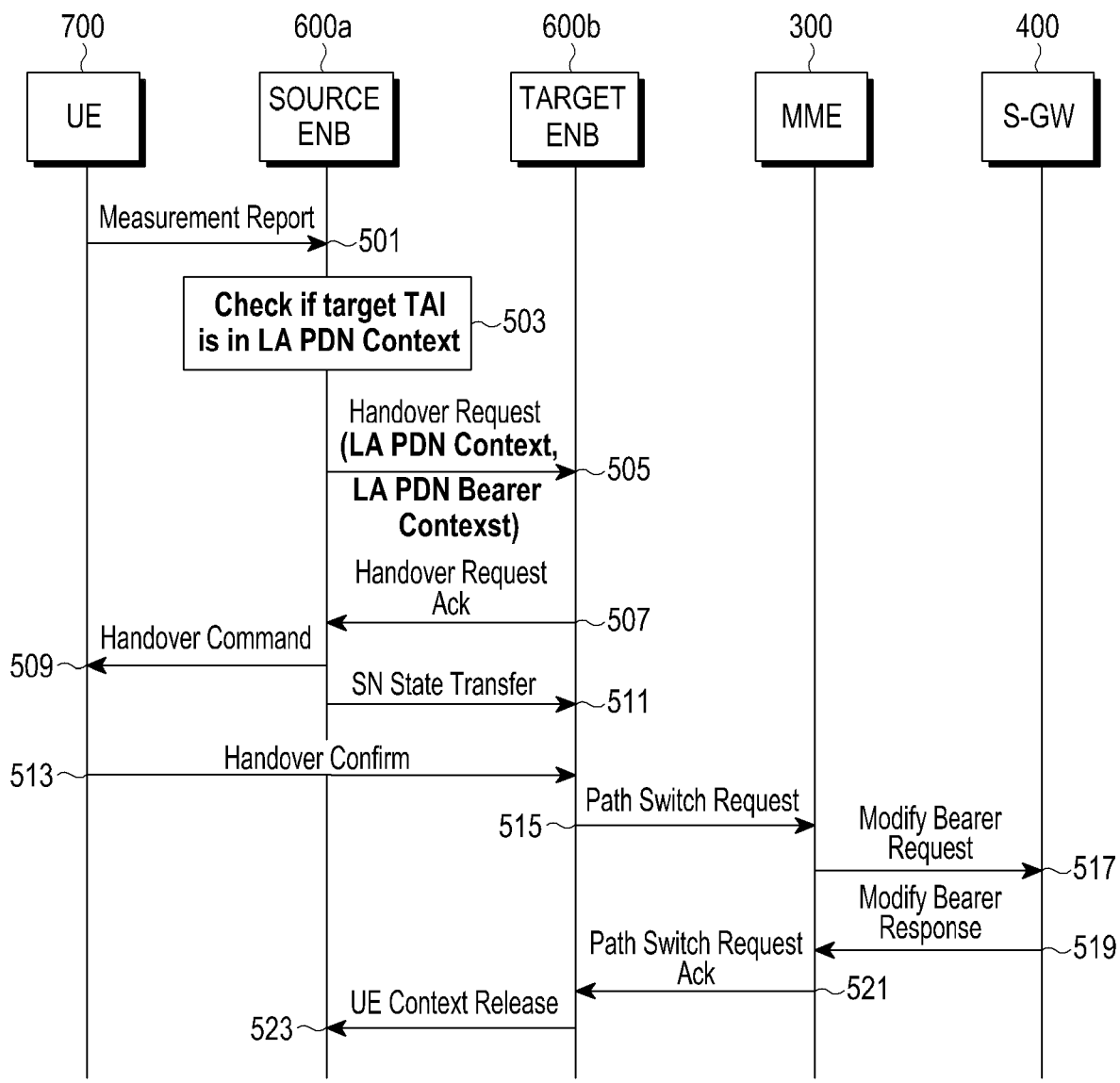
FIG. 5 is a diagram illustrating a signal flow for a procedure for transmitting an LA PDN context during X2 handover according to an embodiment of the present disclosure.
Figure 6:
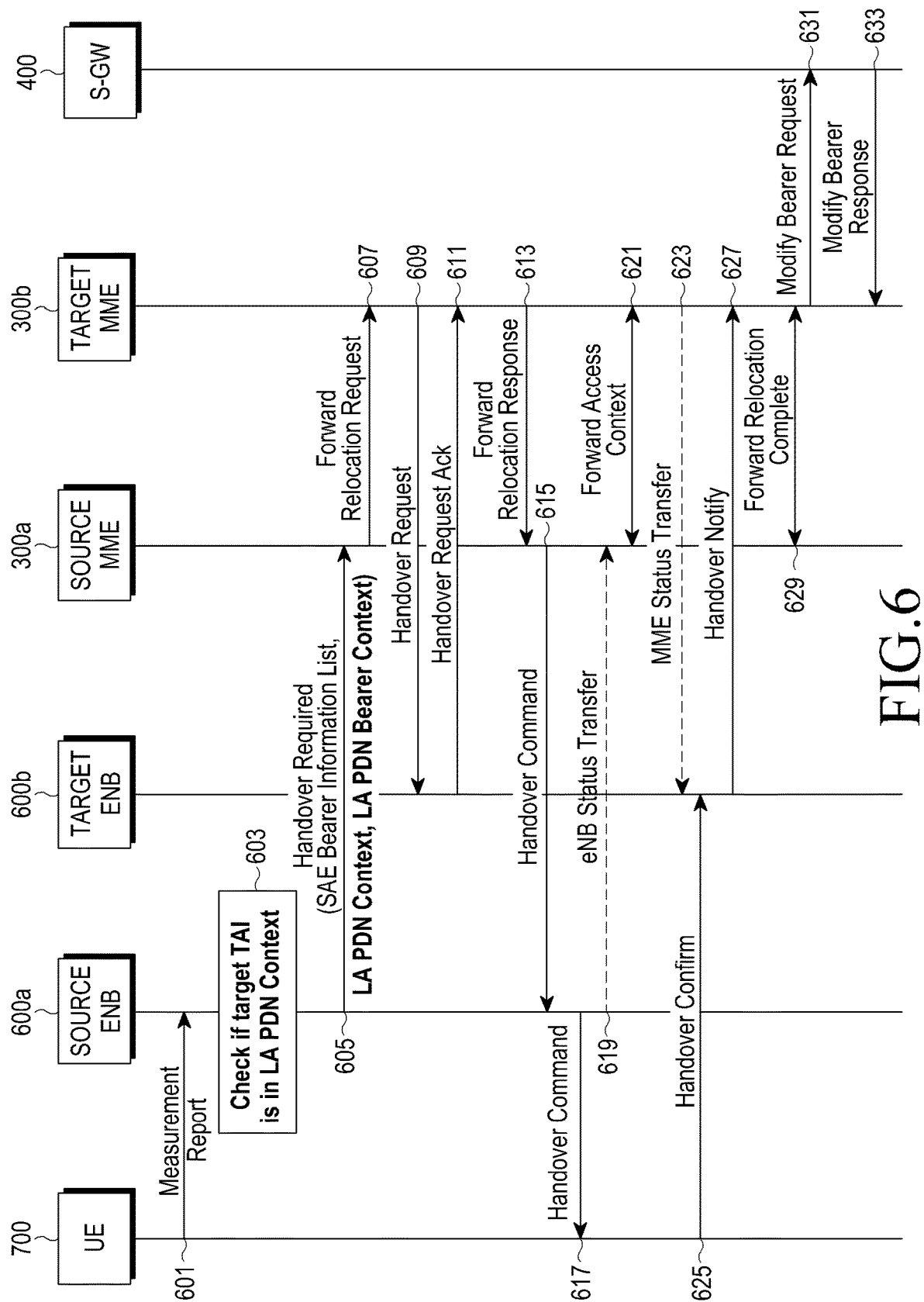
FIG. 6 is a diagram illustrating a signal flow for a procedure for transmitting an LA PDN context during S1 handover according to an embodiment of the present disclosure.

With reference to FIGS. 5 and 6, a procedure for transmitting an LA PDN context during handover according to an embodiment of the present disclosure will be described below.

FIG. 5 is a diagram illustrating a signal flow for a procedure for transmitting an LA PDN context during X2 handover according to an embodiment of the present disclosure. It is assumed herein that the UE 700 in connected state moves from a source eNB 600a to a target eNB 600b in the same LA.

Referring to FIG. 5, the UE 700 that moves to the target eNB 600b transmits a measurement report to the source eNB 600a in operation 501 and the source eNB 600a checks whether current location information (TAI) about the UE 700 is included in an LA PDN context in operation 503. In an embodiment of the present disclosure, it is assumed that the current location information (TAI) about the UE 700 is included in the LA PDN context.

In operation 505, the source eNB 600a transmits a handover request message including an LA PDN handover context to the target eNB 600b. The LA PDN handover context includes an LA PDN context and an LA PDN bearer context. The LA PDN context includes an LA ID and a TA list, and the LA PDN bearer context includes related bearer IDs (for example, Evolved Radio Access Bearer (E-RAB) IDs).

A bearer configuration is modified and a communication path is switched from the source eNB 600a to the target eNB 600b in operations 507 to 523 according to a known X2 handover procedure of the 3GPP EPS. Therefore, operations 507 to 523 are not described herein in detail.

FIG. 6 is a diagram illustrating a signal flow for a procedure for transmitting an LA PDN context during S1 handover according to an embodiment of the present disclosure. It is assumed herein that the UE 700 in connected state moves from the source eNB 600a to the target eNB 600b in the same LA.

Referring to FIG. 6, the UE 700 that moves to the target eNB 600b transmits a measurement report to the source eNB 600a in operation 601, and the source eNB 600a checks whether current location information (TAI) about the UE 700 is included in an LA PDN context in operation 603. In an embodiment of the present disclosure, it is assumed that the current location information (TAI) about the UE 700 is included in the LA PDN context.

In operation 605, the source eNB 600a transmits a handover request message including an LA PDN handover context to the target eNB 600b. The LA PDN handover context includes an LA PDN context, an LA PDN bearer context, and a bearer information list (for example, a System Architecture Evolution (SAE) Bearer Information List in the EPS). The LA PDN context includes an LA ID and a TA list.

Table 1 below illustrates a transparent container including the LA PDN handover context of operation 605.

TABLE 1

| IE/<br>Group<br>Name | Pre-<br>sence | Range | IE type<br>and<br>reference | Semantics<br>description | Criti-<br>cality | Assigned<br>Criticality |
|---|---|---|---|---|---|---|
| RRC<br>Container | M | | OCTET<br>STRING | | — | — |
| SAE<br>Bearers<br>infor-<br>mation<br>List | M | | | | YES | Ignore |
| >SAE<br>Bearers<br>infor-<br>mation<br>item | | 1 to<br><max<br>no of<br>SAE<br>bearers> | | | EACH | Ignore |
| >>SAE<br>Bearer<br>ID | M | | BIT<br>STRING<br>(SIZE(8)) | | — | — |
| >>DL<br>for-<br>warding | O | | 9.2.3.14 | | | |

Handover-related signaling is performed between the source eNB 600a and the target eNB 600b and between a source MME 300a and a target MME 300b in operations 607 to 633 according to a known S1 handover procedure of the 3GPP EPS. Therefore, operations 607 to 633 are not described herein in detail.

Now, a description will be given of an LA PDN disconnection procedure according to an embodiment of the present disclosure.

When the UE 700 moves in an idle state or performs a handover procedure in a connected state, the LA PDN disconnection procedure may be performed. The UE 700 and the network perform a TAU procedure during the LA PDN disconnection procedure.

Figure 7:
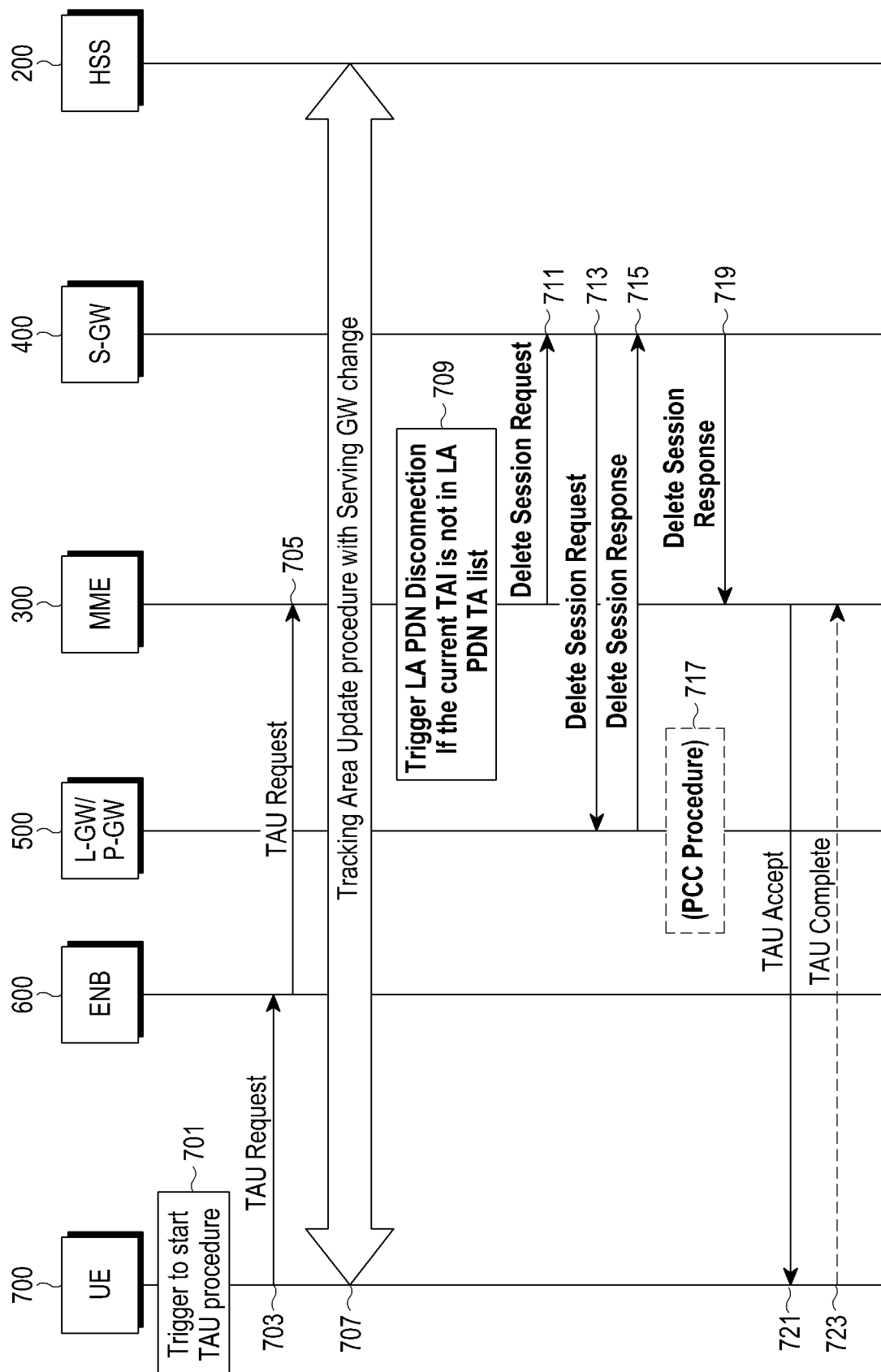
FIG. 7 is a diagram illustrating a signal flow for an LA PDN disconnection procedure according to an embodiment of the present disclosure.

FIG. 7 is a diagram illustrating a signal flow for an LA PDN disconnection procedure according to an embodiment of the present disclosure.

Referring to FIG. 7, the UE 700 starts a TAU procedure for LA PDN disconnection in operation 701 and transmits a TAU request message to the eNB 600 in operation 703. In operation 705, the eNB 600 transmits a TAU request message to the MME 300. The TAU procedure is performed along with an S-GW change, as defined in section 5.3.3.1 of 3GPP TS 23.401 in operation 707.

In operation 709, the MME 300 checks whether the current location information (TAI) about the UE 700 is included in an LA PDN TA list. In the absence of the current location information (TAI) about the UE 700 in the LA PDN TA list, the MME 300 triggers LA PDN disconnection. Thus, the MME 300 transmits a delete session request message to the S-GW 400 in operation 711. The S-GW 400 transmits a delete session request message to the L-GW 500 in operation 713. When the L-GW 500 deletes a session, the L-GW 500 transmits a delete session response message to the S-GW 400 in operation 715 and then performs a PCC function along with the session deletion in operation 717. Upon receipt of the session delete response message in operation 715, the HSS 200 transmits a session delete response message to the MME 300 in operation 719. In operation 721, the MME 300 transmits a TAU accept message to the UE 700. The UE 700 transmits a TAU complete message to the MME 300 in operation 723.

An LA PDN disconnection procedure according to an embodiment of the present disclosure will be described below.

The MME 300 and the UE 700 may maintain an LA PDN context until expiration of an LA PDN context retain timer, rather than release an LA PDN connection according to an embodiment of the present disclosure. In the present disclosure, this operation mode is defined as LA PDN away mode.

Figure 8:
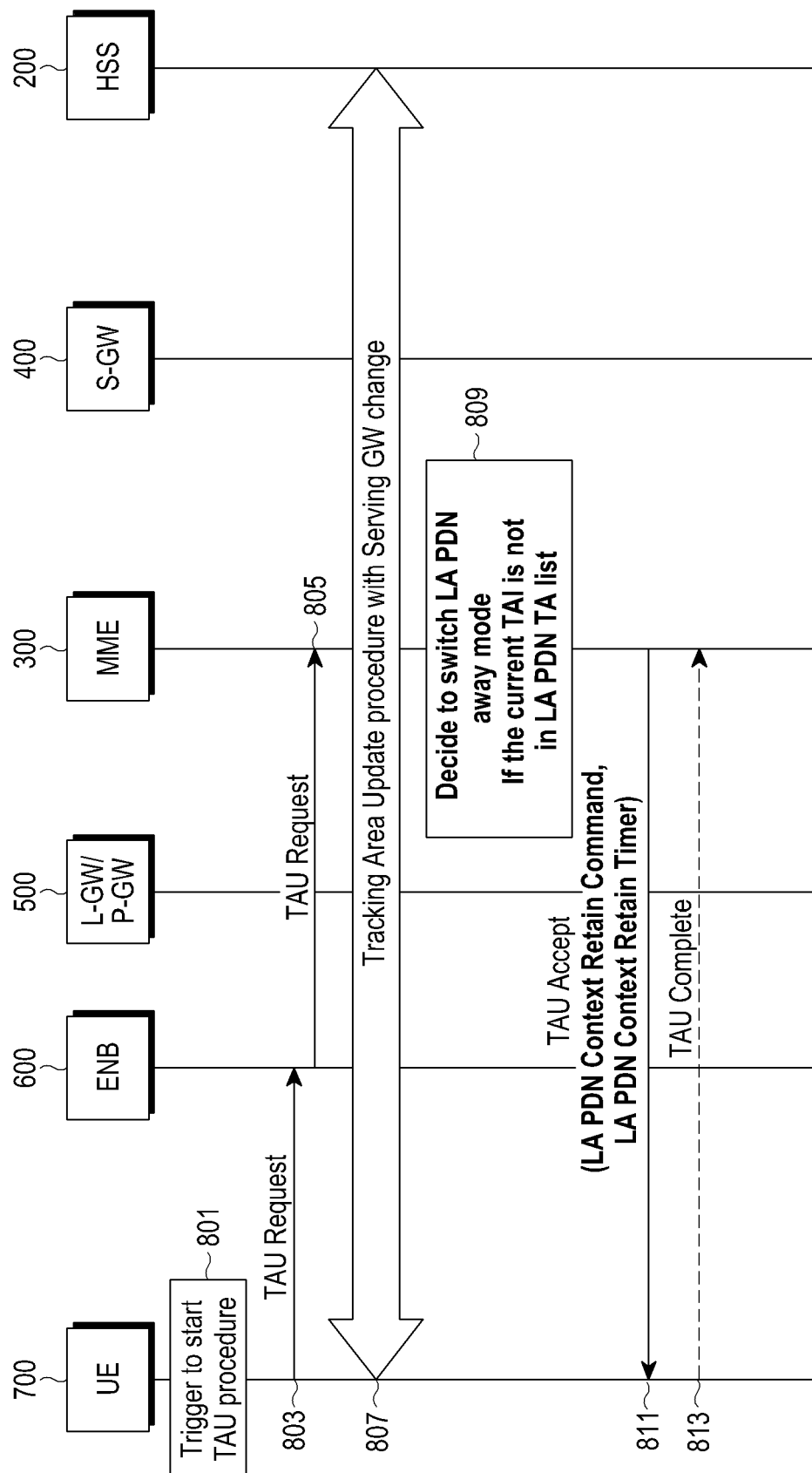
FIG. 8 is a diagram illustrating a signal flow for a deferred LA PDN disconnection procedure according to an embodiment of the present disclosure.

FIG. 8 is a diagram illustrating a signal flow for a deferred LA PDN disconnection procedure according to an embodiment of the present disclosure.

Referring to FIG. 8, operations 801 to 807 are performed in the same manner as operations 701 to 707 of FIG. 7 and thus will not be described herein. In operation 809, the MME 300 determines whether current location information (TAI) about the UE 700 is included in an LA PDN TA list. In the absence of the current location information (TAI) about the UE 700, the MME 300 determines to switch to the LA PDN away mode and performs one of the following operations 1), 2), and 3) in relation to deferred LA PDN disconnection according to the state of the LA PDN context retain timer.

1) Registration of the LA PDN context retain timer: if the deferred LA PDN disconnection is enabled, the MME 300 defers release of an LA PDN connection. That is, the MME 300 registers the LA PDN context retain timer instead of releasing the LA PDN connection.
2) Deletion of the LA PDN context retain timer: if the UE 700 completes a TAU procedure before expiration of the LA PDN context retain timer in an LA, the MME 300 deletes the LA PDN context retain timer.
3) Expiration of the LA PDN context retain timer: if the LA PDN context retain timer expires without the TAU procedure of the UE 700 in the LA, the MME 300 performs the LA PDN disconnection procedure.

The MME 300 transmits a TAU accept message to the UE 700 in operation 811 and the UE 700 transmits a TAU complete message to the MME 300 in operation 813. The TAU accept message includes an LA PDN context retain command and information about the LA PDN context retain timer. The UE 700 may be aware that the deferred LA PDN disconnection procedure is performed by checking the information included in the TAU accept message.

If the embodiment of FIG. 8 is implemented, even though the UE 700 moves out of the LA, when the MME 300 decides to maintain the LA PDN connection, the MME 300 may set the state of the LA PDN context to the LA PDN away mode. In this case, the MME 300 may transmit the TAU accept message with, for example, an LA PDN maintain action code indicator as the LA PDN context retain command and the value of the timer as the information about the LA PDN context retain timer to the UE 700 in operation 811.

In an embodiment of the present disclosure, if the UE 700 returns to the LA in the LA PDN away mode, an LA PDN reconnection procedure may be performed. Then the MME 300 transmits an LA PDN context and a stored LA PDN bearer context during handover of the UE 700 in connected state or upon receipt of a service request from the UE 700 in idle state.

Figure 9:
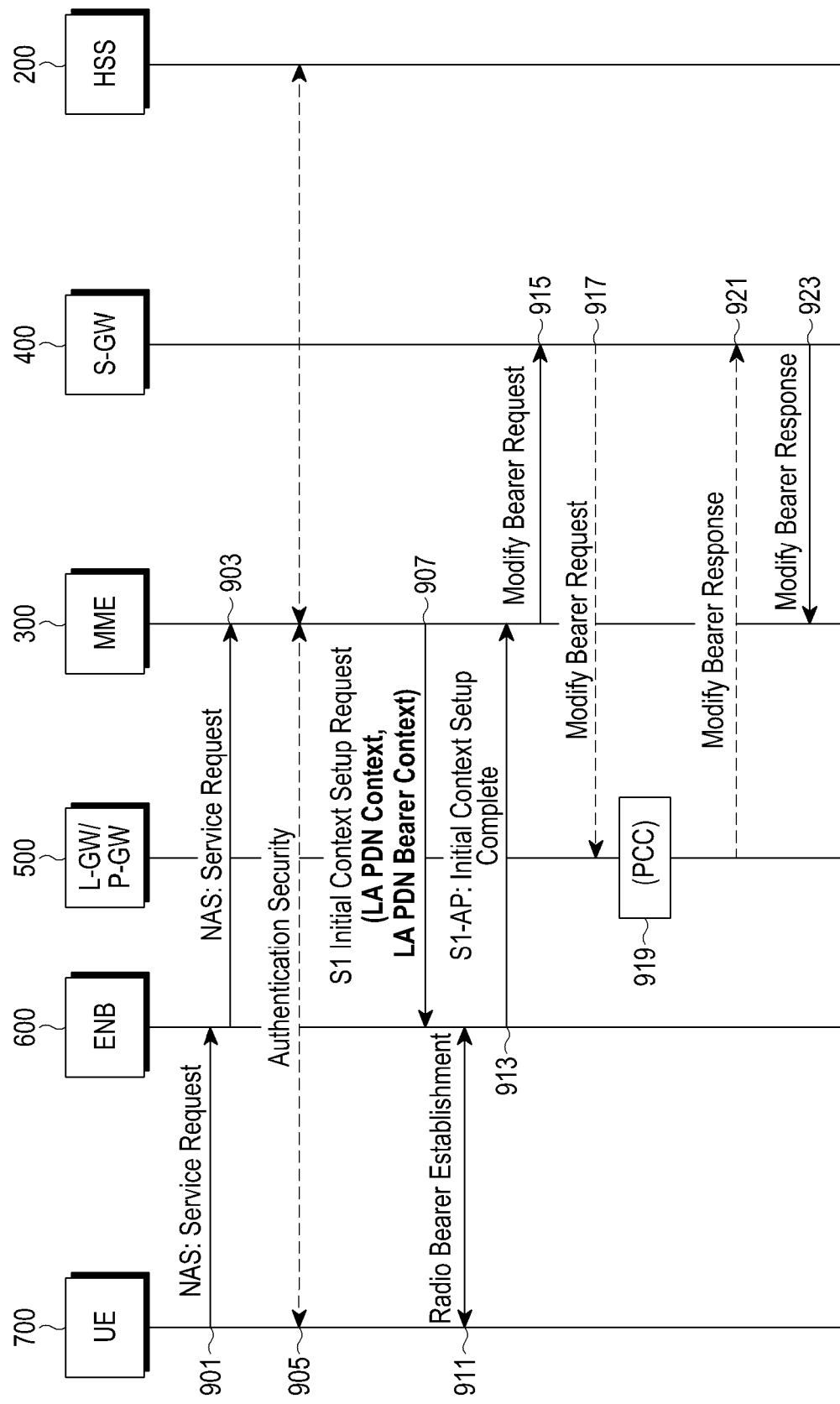
FIG. 9 is a diagram illustrating a signal flow for an LA PDN reconnection procedure according to an embodiment of the present disclosure.

FIG. 9 is a diagram illustrating a signal flow for an LA PDN reconnection procedure according to an embodiment of the present disclosure. The LA PDN reconnection procedure is initiated by a service request from the UE 700 in the idle state.

Referring to FIG. 9, the UE 700 returns to an LA in the LA PDN away mode and thus performs a service request procedure to the eNB 600 in operation 901. The eNB 600 transmits a service request of the UE 700 to the MME 300 in operation 903. As an example, the service request is transmitted by NAS signaling. In operation 905, the MME 300 and the HSS 200 perform an authentication security procedure. If the MME 300 determines that an LA PDN connection is still in the LA PDN away mode in an embodiment of the present disclosure, the MME 300 transmits an S1 initial context setup request message including the LA PDN context and the LA bearer context to the eNB 600 in operation 907.

In operation 911, the UE 700 and the eNB 600 perform a radio bearer setup procedure related to an LA PDN connection. The eNB 600 transmits an initial context setup complete message to the MME 300 in operation 913 and the MME transmits a bearer modify request message for LA PDN reconnection to the S-GW 400 in operation 915. In operation 917, the S-GW 400 transmits the bearer modify request message to the L-GW 500. The L-GW 500 performs a PCC function for the LA PDN reconnection in operation 919 and transmits a response message to the bearer modify request message to the S-GW 400 in operation 921. The S-GW 400 transmits a response message to the bearer modify request message received in operation 915 to the MME 300 in operation 923.

Figure 10:
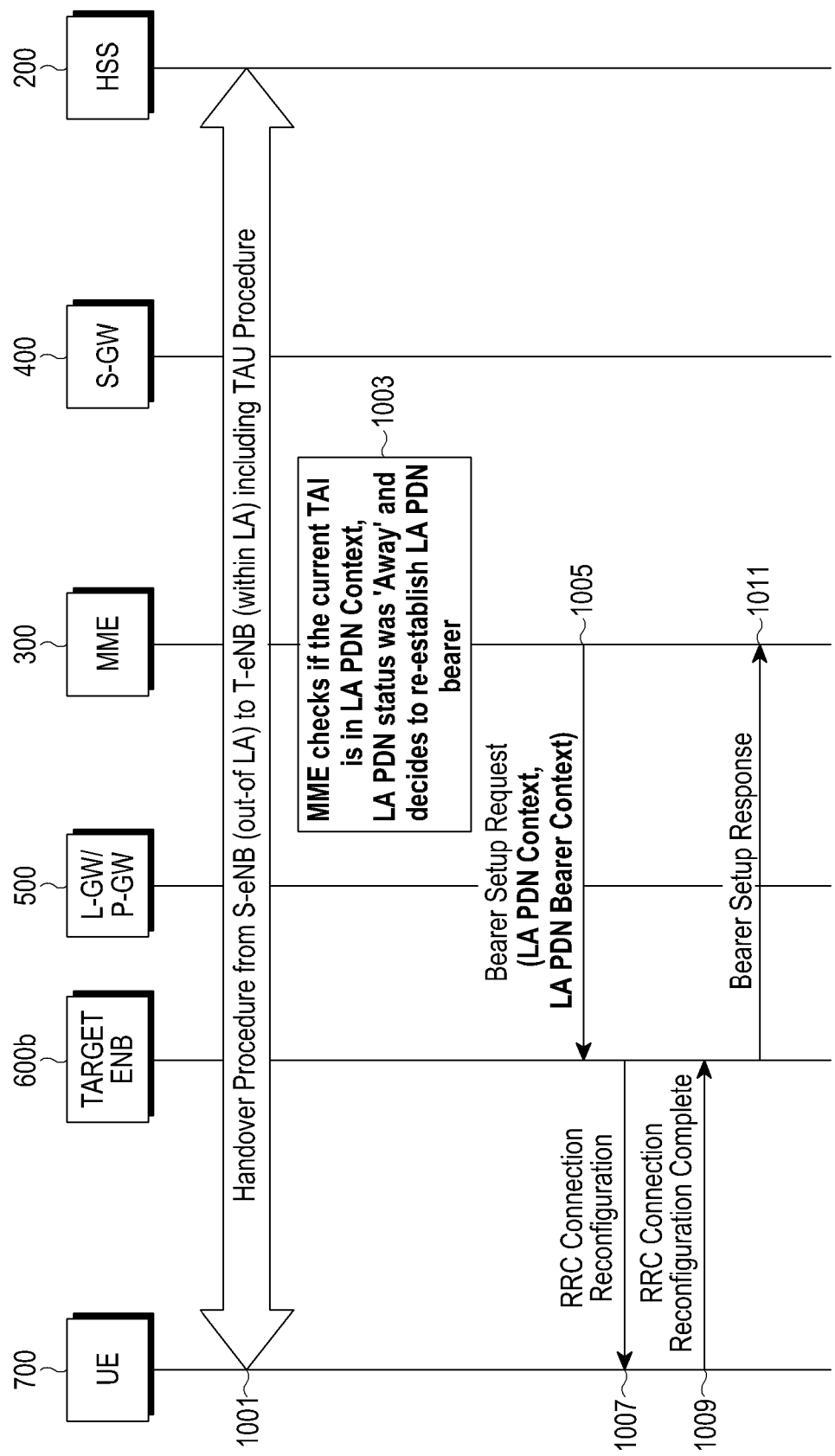
FIG. 10 is a diagram illustrating a signal flow for an LA PDN reconnection procedure according to an embodiment of the present disclosure.

FIG. 10 is a diagram illustrating a signal flow for an LA PDN reconnection procedure according to an embodiment of the present disclosure. In the embodiment of FIG. 10, the LA PDN reconnection procedure is triggered by handover of the UE 700 in the connected state.

Referring to FIG. 10, as the UE 700 returns to the LA in the LA PDN away mode, the UE 700 performs a handover procedure in connected mode in operation 1001. The handover procedure is performed from a source eNB (S-eNB) outside the LA to a target eNB (T-eNB) within the LA, including a TAU procedure. In operation 1003, the MME 300 determines whether current location information (TAI) about the UE 700 is included in an LA PDN context before expiration of the LA PDN context retain timer. In the presence of the current location information (TAI) about the UE 700 in the LA PDN context, the MME 300 determines whether the state of an LA PDN is the LA PDN away mode. If both of the conditions are satisfied, the MME 300 decides to reconfigure (reconnect) an LA PDN bearer. If the MME 300 decides to reconfigure the LA PDN bearer in operation 1003, the MME 300 transmits a bearer setup request message including an LA PDN context and an LA bearer context to the T-eNB 600*b* in operation 1005. Subsequently, an RRC reestablishment procedure is performed between the UE 700 and the T-eNB 600*b* in operations 1007 and 1009. In operation 1011, the T-eNB 600*b* transmits a bearer setup response message indicating the bearer reconfiguration to the MME 300.

Figure 11:
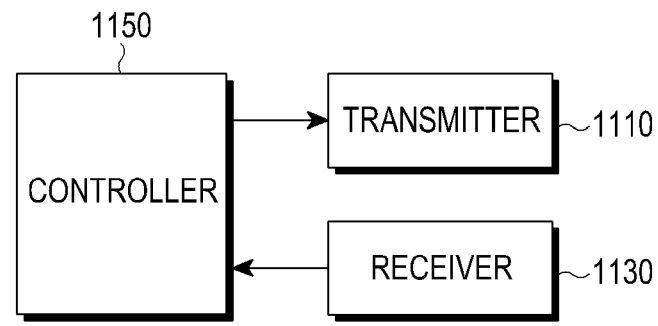
FIG. 11 is a block diagram of a User Equipment (UE) according to an embodiment of the present disclosure.

FIG. 11 is a block diagram of a UE according to an embodiment of the present disclosure.

Referring to FIG. 11, the UE includes a transmitter 1110 and a receiver 1130, which respectively transmit and receive messages according to the various embodiments of the present disclosure illustrated in FIGS. 1A to 10 in order to establish, maintain, release, or reestablish an LA PDN connection with an eNB through a wireless network. The UE further includes a controller 1150 that controls the transmission and reception of messages according to the various embodiments of the present disclosure illustrated in FIGS. 1A to 10 to and from an eNB in order to establish, maintain, release, or reestablish an LA PDN connection and provides overall control to the UE so that the UE may conduct communication in each communication state of an LA PDN.

Figure 12:
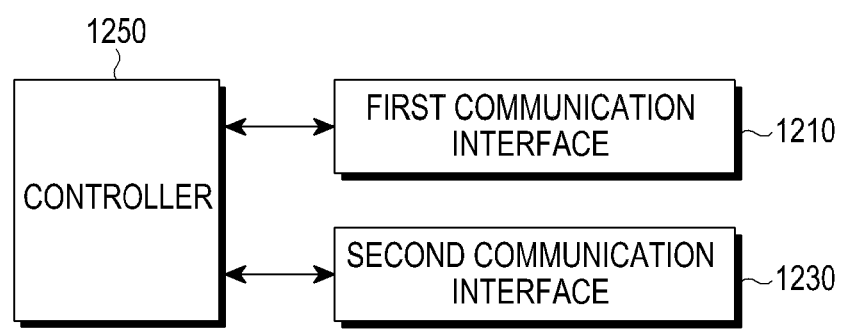
FIG. 12 is a block diagram of an evolved Node B (eNB) according to an embodiment of the present disclosure.

FIG. 12 is a block diagram of an eNB according to an embodiment of the present disclosure.

Referring to FIG. 12, the eNB includes a first communication interface 1210 for transmitting and receiving messages to and from a UE through a wireless network according to the various embodiments of the present disclosure illustrated in FIGS. 1A to 10 during establishment, maintenance, release, or reestablishment of an LA PDN connection in the UE 700, and a second communication interface 1230 for transmitting and receiving signals to and from other network entities of an EPS system such as another eNB or an MME via a predetermined communication interface. The eNB further includes a controller 1250 that controls the transmission and reception of the various messages as described above. The eNB transmits and receives messages for establishment, maintenance, release, or reestablishment of an LA PDN connection in the UE 700 in predetermined procedures and participates in procedures such as current location information check, TAU, bearer establishment, and handover of a UE in the LA PDN based on the transmitted and received messages according to the various embodiments of the present disclosure illustrated in FIGS. 1A to 10.

While not shown, an MME may also be configured to include a communication interface for transmitting and receiving messages to and from a UE through a wireless network according to the various embodiments of the present disclosure illustrated in FIGS. 1A to 10 during establishment, maintenance, release, or reestablishment of an LA PDN connection in the UE, and a controller for controlling related operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a network entity for mobility management in a wireless communication system, the method comprising:
   receiving, from a terminal, a message transmitted based on information on at least one service area in which an access to a local area (LA) packet data network (PDN) is available, the message indicating a request for a protocol data unit (PDU) session establishment procedure for the LA PDN;
   determining whether a current location of the terminal is in the at least one service area for the LA PDN based on reception of the request for the PDU session establishment procedure for the LA PDN; and performing the PDU session establishment procedure for the LA PDN in case that the current location of the terminal is in the at least one service area for the LA PDN, wherein when the terminal moves out of the at least one service area for the LA PDN after a session for the LA PDN is established using the PDU session establishment procedure, the session for the LA PDN is deactivated, and wherein the information on the at least one service area includes a set of tracking areas (TAs).

2. The method of claim 1, wherein the information on the at least one service area is provided to the terminal.

3. The method of claim 1, wherein the PDU session establishment procedure is not performed, in case that the current location of the terminal is not included in the at least one service area for the LA PDN.

4. The method of claim 1, wherein in case that the terminal moves out of the at least one service area for the LA PDN after the PDU session for the LA PDN is established using the PDU session establishment procedure, a release procedure is performed for the PDU session for the LA PDN.

5. A method performed by a terminal in a wireless communication system, the method comprising:

receiving information on at least one service area in which an access to a local area (LA) packet data network (PDN) is available;

determining whether a current location of the terminal is in the at least one service area for the LA PDN based on the information on the at least one service area; and performing a protocol data unit (PDU) session establishment procedure for the LA PDN corresponding to the current location of the terminal in case that the current location of the terminal is in the at least one service area for the LA PDN, wherein when the terminal moves out of the at least one service area for the LA PDN after a session for the LA PDN is established using the PDU session establishment procedure, the session for the LA PDN is deactivated, and wherein the information on the at least one service area includes a set of tracking areas (TAs).

6. The method of claim 5, wherein the PDU session establishment procedure is not performed, in case that the current location of the terminal is not in the at least one service area for the LA PDN.

7. The method of claim 5, wherein in case that the terminal moves out of the at least one service area for the LA PDN after the PDU session for the LA PDN is established using the PDU session establishment procedure, a release procedure for the PDU session for the LA PDN is performed.

8. The method of claim 5, wherein in case that terminal moves out of the at least one service area for the LA PDN and a predefined timer is expired after the PDU session for the LA PDN is established using the PDU session establishment procedure, a release procedure for the PDU session for the LA PDN is performed.

9. The method of claim 5, wherein the information on the at least one service area further includes information a local area access point name (LA APN).

10. A network entity for mobility management in a wireless communication system, the network entity comprising:

a transceiver; and a processor coupled with the transceiver and configured to:

receive a message transmitted based on information on at least one service area in which an access to a local area (LA) packet data network (PDN) is available, the message indicating a request for a protocol data unit (PDU) session establishment procedure for the LA PDN;

determine whether a current location of a terminal is in the at least one service area for the LA PDN based on reception of the request for the PDU session establishment procedure for the LA PDN; and perform the PDU session establishment procedure for the LA PDN in case that the current location of the terminal is in the at least one service area for the LA PDN, wherein when the terminal moves out of the at least one service area for the LA PDN after a session for the LA PDN is established using the PDU session establishment procedure, the session for the LA PDN is deactivated, and wherein the information on the at least one service area includes a set of tracking areas (TAs).

11. The network entity for mobility management of claim 10, wherein the information on the at least one service area is provided to the terminal.

12. The network entity for mobility management of claim 10, wherein the PDU session establishment procedure is not performed, in case that the current location of the terminal is not included in the at least one service area for the LA PDN.

13. The network entity for mobility management of claim 10, wherein in case that the terminal moves out of the at least one service area for the LA PDN after the PDU session for the LA PDN is established using the PDU session establishment procedure, a release procedure is performed for the PDU session for the LA PDN.

14. The network entity for mobility management of claim 10, wherein the information on the at least one service area further includes information a local area access point name (LA APN).

15. A terminal in a wireless communication system, the terminal comprising:

a transceiver; and a processor coupled with the transceiver and configured to:

receive information on at least one service area in which an access to a local area (LA) packet data network (PDN) is available;

determine whether a current location of the terminal is in the at least one service area for the LA PDN based on the information on the at least one service area; and performing a protocol data unit (PDU) session establishment procedure for the LA PDN corresponding to the current location of the terminal in case that the current location of the terminal is in the at least one service area for the LA PDN, wherein when the terminal moves out of the at least one service area for the LA PDN after a session for the LA PDN is established using the PDU session establishment procedure, the session for the LA PDN is deactivated, and wherein the information on the at least one service area includes a set of tracking areas (TAs).

16. The terminal of claim 15, wherein the PDU session establishment procedure is not performed, in case that the current location of the terminal is not in the at least one service area for the LA PDN.

17. The terminal of claim 15, wherein in case that the terminal moves out of the at least one service area for the LA PDN after the PDU session for the LA PDN is established using the PDU session establishment procedure, a release procedure for the PDU session for the LA PDN is performed.

18. The terminal of claim 15, wherein in case that terminal moves out of the at least one service area for the LA PDN and a predefined timer is expired after the PDU session for the LA PDN is established using the PDU session establishment procedure, a release procedure for the PDU session for the LA PDN is performed.

19. The terminal of claim 15, wherein the information on the at least one service area further includes information a local area access point name (LA APN).

\* \* \* \* \*